US012117294B2

(12) United States Patent
Sabater

(10) Patent No.: US 12,117,294 B2
(45) Date of Patent: Oct. 15, 2024

(54) SINGLE BODY MULTI-MODE MECHANICAL RESONATOR ACCELEROMETER

(71) Applicant: Naval Information Warfare Center Pacific, San Diego, CA (US)

(72) Inventor: Andrew B. Sabater, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 195 days.

(21) Appl. No.: 17/950,206

(22) Filed: Sep. 22, 2022

(65) Prior Publication Data

US 2024/0102805 A1 Mar. 28, 2024

(51) Int. Cl.
*G01C 19/5726* (2012.01)
*G01C 19/574* (2012.01)
*G01P 15/097* (2006.01)

(52) U.S. Cl.
CPC ....... *G01C 19/5726* (2013.01); *G01C 19/574* (2013.01); *G01P 15/097* (2013.01)

(58) Field of Classification Search
CPC .... G01P 15/097; G01P 15/0975; G01P 15/10; G01P 15/09; G01P 15/0907; G01P 15/0915; G01P 15/0922; G01C 19/5726; G01C 19/574; G01C 19/5719; G01C 19/5733
See application file for complete search history.

(56) References Cited

U.S. PATENT DOCUMENTS

| | | | |
|---|---|---|---|
| 6,843,127 B1* | 1/2005 | Chiou | G01C 19/5719 73/504.12 |
| 10,823,569 B1* | 11/2020 | Shao | G01C 19/5712 |
| 2003/0037614 A1* | 2/2003 | Nguyen | G01C 19/5719 73/504.04 |
| 2004/0250620 A1* | 12/2004 | Nicu | G01C 19/574 73/504.15 |
| 2005/0050954 A1* | 3/2005 | Chaumet | G01C 19/5747 73/504.12 |
| 2009/0272189 A1* | 11/2009 | Acar | G01C 19/574 74/5.37 |

(Continued)

*Primary Examiner* — Helen C Kwok
(74) *Attorney, Agent, or Firm* — Naval Information Warfare Center, Pacific; Kyle Eppele; Matthew D. Pangallo

(57) ABSTRACT

A single body multi-mode mechanical resonator includes two or more spring-mass devices, one or more anchor springs, a phase 1 parallel plate electrode and a phase 2 parallel plate electrode, a plurality of interdigitated shaped combs, a plurality of interdigitated drive combs, and a plurality of interdigitated sense combs. The spring-mass devices further include two or more lumped masses and one or more anchor springs. The coupling springs couple the motion of the two or more lumped masses. The parallel plate electrodes apply forces to the in-phase mode that yield equal in magnitude but opposite in sign frequency shifts of the anti-phase mode. The shaped combs compensate for a frequency drift of the anti-phase mode and cancels first-order displacement effects. The drive combs are aligned to the anti-phase mode, with a frequency selective excitation. The sense combs are aligned to the anti-phase mode and capable of cancelling common-mode noise effects.

10 Claims, 9 Drawing Sheets

(56) References Cited

U.S. PATENT DOCUMENTS

| | | | |
|---|---|---|---|
| 2010/0313657 A1* | 12/2010 | Trusov | G01C 19/5747 |
| | | | 73/504.16 |
| 2014/0260615 A1* | 9/2014 | Simon | H03H 9/2468 |
| | | | 310/300 |
| 2015/0377623 A1* | 12/2015 | Waters | G01C 19/5705 |
| | | | 73/504.12 |
| 2018/0172446 A1* | 6/2018 | Prikhodko | G01C 19/567 |
| 2019/0017823 A1* | 1/2019 | Shao | G01C 19/5769 |
| 2019/0064205 A1* | 2/2019 | Tocchio | G01P 15/125 |

* cited by examiner

SINGLE BODY MULTI-MODE MECHANICAL RESONATOR ACCELEROMETER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; ssc_pac_t2@navy.mil. Reference Navy Case Number 210863.

BACKGROUND

Inertial navigation provides a means to navigate independent of global positioning satellites (GPS) and is immune to issues related to the use of a GPS. Inertial navigation is based on fusing measurements from accelerometers and gyroscopes to estimate position, velocity, and attitude. In order to extract the actual acceleration of a vehicle while moving, a model for local gravity is needed to compensate the output of the accelerometers. In order to separate acceleration due to motion and acceleration due to gravity, a gravity gradiometer can be used. The gravity gradiometer measures the gravity gradient by using pairs of accelerometers to take differential measurements of acceleration.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Figure 1:
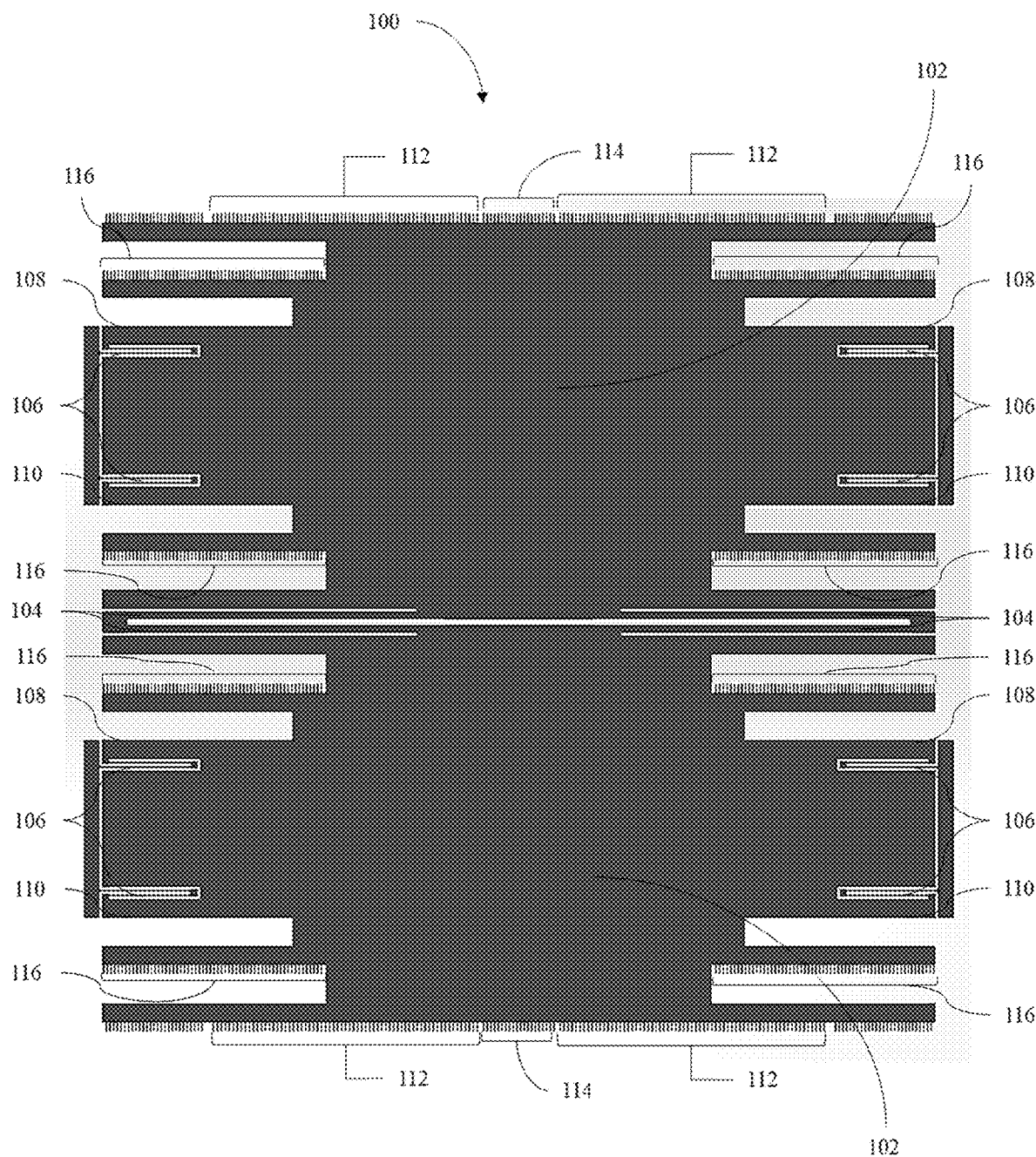
FIG. 1 is 2D schematic an example of a multi-mode mechanical resonator in an in-phase mode.

Gravity gradiometers are currently used to measure both acceleration due to motion and acceleration due to gravity. An example is the Bell gradiometer. One of the core features of the Bell gradiometer is the accelerometers are mounted on a rotating platform to measure and control slow drift associated with the accelerometers. This feature helps to correct for temperature effects or the slow aging processes that influence the drift of the accelerometers. In general, gravity gradiometers are too large for some platforms. There is no suitable replacement for smaller platforms. In addition, current gravity gradiometers are expensive. Therefore, attempting to modify the known gravity gradiometers to fit smaller platforms would be inefficient and unfeasible.

In the device herein, a single-body multi-mode mechanical resonator accelerometer is used to measure both acceleration due to motion and acceleration due to gravity. The single-body multi-mode mechanical resonator accelerometer measures acceleration by detecting a variation in the frequency of an oscillator (i.e., a single body multi-mode resonator). Since the single-body multi-mode mechanical resonator accelerometer is effectively an oscillator with intentional sensitivity to acceleration, the bias drift is caused by the same effects as frequency drift in oscillators. To mitigate drift associated, for example, with temperature, a pair of multi-mode mechanical resonator accelerometers, each with only one single body multi-mode resonator, can be mounted such that their sensitive axes are aligned in opposite directions. In addition, the multi-mode mechanical resonator accelerometer is smaller and cheaper when compared to the current gravity gradiometers. Therefore, the single-body multi-mode mechanical resonator accelerometer can be efficiently incorporated into small platforms or large platforms depending on the application.

The single-body multi-mode mechanical resonator herein includes two or more spring-mass devices, one or more coupling springs, a phase 1 parallel plate electrode and a phase 2 parallel plate electrode, a plurality of interdigitated shaped combs, a plurality of interdigitated drive combs, and a plurality of interdigitated sense combs. The two or more spring-mass devices further include two or more lumped masses and one or more anchor springs. The one or more coupling springs are attached to each lumped mass and couple the motion of the two or more lumped masses. The phase 1 parallel plate electrode and the phase 2 parallel plate electrode apply forces to the in-phase mode that yield, in the presence of acceleration, equal in magnitude but opposite in sign frequency shifts of the anti-phase mode. The plurality of interdigitated shaped combs compensate for a frequency drift of the anti-phase mode and cancels first-order displacement effects of the plurality of interdigitated shaped combs. The plurality of interdigitated drive combs are aligned to resonate the anti-phase mode that has a frequency selective excitation. The plurality of interdigitated sense combs are aligned to the anti-phase mode and capable of cancelling common-mode noise effects.

Referring now to FIG. 1, a 2D schematic an example of a single body multi-mode mechanical resonator 100 in an in-phase mode is shown. FIG. 1 is for illustrative purposes only to aid in viewing and should not be construed as being limiting or directed to a particular material or materials. The single body multi-mode mechanical resonator 100 includes two or more spring-mass devices 102. The each spring-mass device 102 includes at least one lumped mass and one or more anchor springs 106. The example in FIG. 1 shows a single body multi-mode mechanical resonator 100 having eight anchor springs 106 total with four anchor springs 106 attached to each lumped mass of the spring mass device 102. In another example, one or more anchor springs 106 may be present in the single body multi-mode mechanical resonator 100. The anchor springs 106 attach the two or more lumped masses to a fixed substrate. In some examples, the fixed substrate may be any fixed substrate capable of being mounted to a chip carrier. An example of the fixed substrate is a silicon fixed substrate. The two or more spring mass devices 102 also have an in-phase mode and an anti-phase mode. This is discussed in greater detail below.

The spring-mass device 102 oscillates when the single body multi-mode mechanical resonator 100 is in use. The spring-mass devices 102 have a motion described with equations (I) and (II):

$$M_1(x''_1 - x''_{1Accel}) = -K_1(x_1 - 0) - K_c(x_1 - x_2) - F_{1A} + F_{1B} \quad (I)$$

$$M_2(x''_2 - x''_{2Accel}) = -K_2(x_2 - 0) - K_c(x_2 - x_1) - F_{2A} + F_{2B} \quad (II)$$

where $M_1$ is a lumped mass of a first mass, $M_2$ is a lumped mass of a second mass, $K_1$ is a first anchor spring stiffness, $K_2$ is a second anchor spring stiffness, $K_c$ is a coupling spring stiffness, $x_1$ is a displacement of the first mass, $x_2$ is a displacement of the second mass, $x''_1$ is an acceleration of the first mass, $x''_2$ is an acceleration of the second mass, $x''_{1Accel}$ is a proper acceleration of the first mass, $x''_{2Accel}$ is a proper acceleration of the second mass, $F_{1A}$ is a phase 1 electrostatic force applied to the first mass, $F_{1B}$ a phase 2 electrostatic force applied to the second mass, $F_{2A}$ is a phase 1 electrostatic force applied to the second mass, and $F_{2B}$ is a phase 2 electrostatic force applied to the first mass. The spring-mass devices 102 have two vibrational modes: an in-phase mode and an anti-phase mode. The in-phase mode (shown in FIG. 1) is where $x_1 = x_2$ in equations (I) and (II). The in-phase mode is sensitive to acceleration. Displacement of the in-phase mode due to acceleration gives rise to a frequency shift of the anti-phase mode. In an example, a frequency shift is designed to occur in a specific, known, or deterministic way. Based on the design of the single body multi-mode mechanical resonator 100 and the voltages applied to the phase 1 parallel plate electrode 108 and the phase 2 parallel plate electrode 110 (discussed in detail below), a deterministic shift in frequency occurs for a given acceleration. Once this relationship is determined using calibrated acceleration inputs, acceleration can be estimated.

Figure 2:
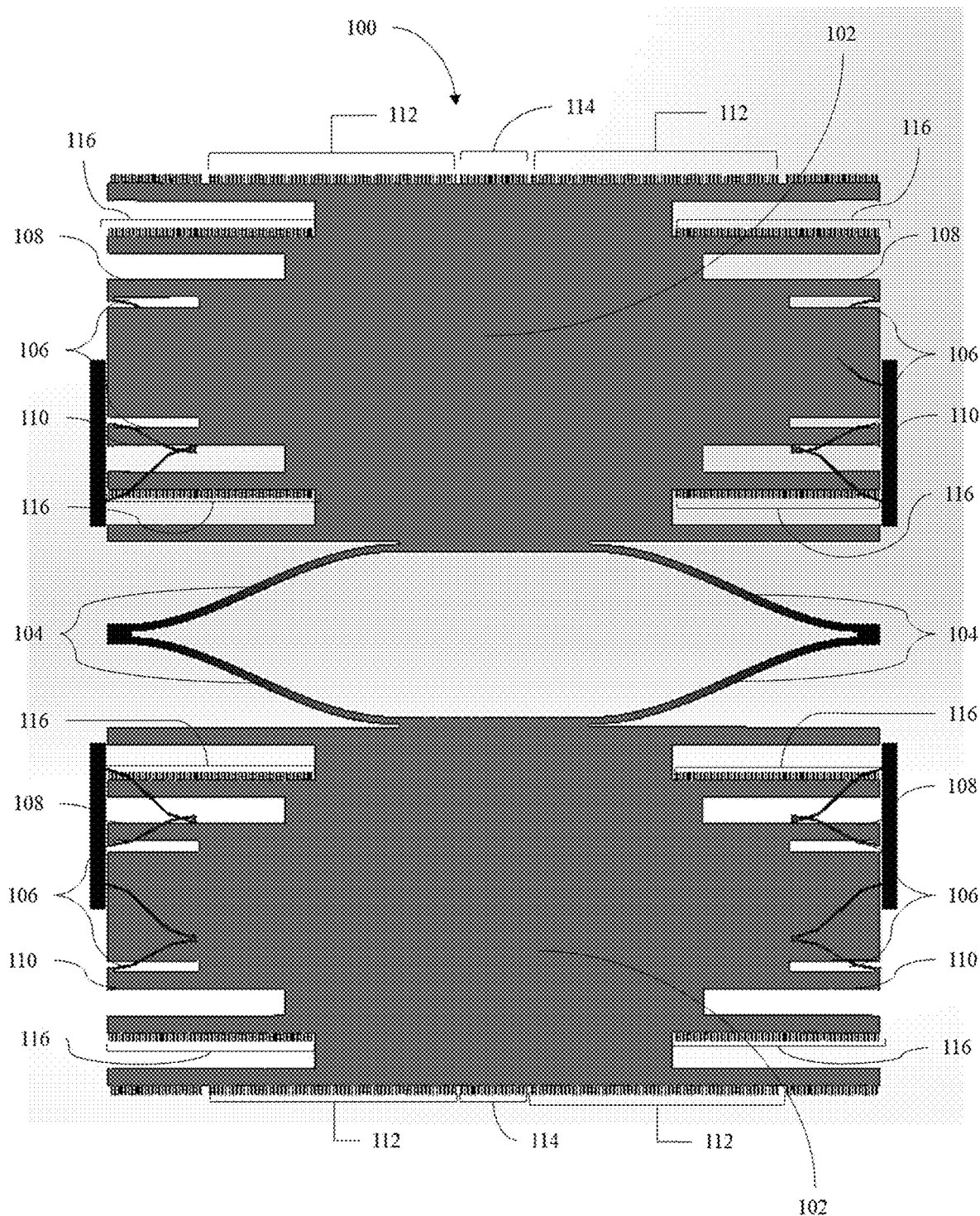
FIG. 2 is 2D schematic an example of a multi-mode mechanical resonator in an anti-phase mode.

An example of the single body multi-mode mechanical resonator 100 operating in an anti-phase mode is shown in FIG. 2. The single body multi-mode mechanical resonator 100 in FIG. 2 is the same multi-mode resonator in FIG. 1, but the single body multi-mode mechanical resonator 100 is operating in an anti-phase mode. FIG. 2 is for illustrative purposes only to aid in viewing and should not be construed as being limiting or directed to a particular material or materials. The anti-phase mode is where $x_1 = -x_2$ in equations (I) and (II). The anti-phase mode is operated in a closed-loop fashion that is self-excited.

Referring back to FIG. 1, the single body multi-mode mechanical resonator 100 includes one or more coupling springs 104. One or more coupling springs 104 are attached to each lumped mass as shown in FIG. 1 and FIG. 2. The coupling springs 104 couple a motion of the two or more lumped masses.

Referring back to FIG. 1, the single body multi-mode mechanical resonator 100 includes a phase 1 parallel plate electrode 108 and a phase 2 parallel plate electrode 110. The phase 1 parallel plate electrode 108 and the phase 2 parallel plate electrode 110 are attached to each lumped mass (i.e., each lumped mass has a phase 1 parallel plate electrode 108 and a phase 2 parallel plate electrode 110) as shown in FIG. 1 and FIG. 1. The phase 1 parallel plate electrode 108 and the phase 2 parallel plate electrode 110 apply forces to the in-phase mode that, in the presence of acceleration, yield equal in magnitude, but opposite in sign frequency shifts of the anti-phase mode. The anti-phase mode (i.e., f-mode) is insensitive to external acceleration and the in-phase mode (i.e., a-mode) is sensitive to acceleration. Anti-phase mode is operated in a positive feedback loop (output of the single body multi-mode mechanical resonator 100 is connected to input with a positive gain) such that electrodes 108, 110 amplitude is kept at a constant value. Displacement of the in-phase mode has the ability to modulate the stiffness of the anti-phase mode, and in turn, the frequency, of the anti-phase mode when operated as a single body multi-mode mechanical resonator via an electrostatic effect associated with the phase 1 and phase 2 parallel plate electrodes 108, 110. The stiffness of the anti-phase mode is derived from the anchor springs 106, the coupling springs 104, and the electrodes 108, 110. As the multi-mode resonator gets closer to the electrodes 108, 110 the frequency decreases. The opposite effect occurs as the multi-mode resonator moves away from the electrodes 108, 110, the frequency increases. When the electrodes 108, 110 are aligned in in-phase mode (i.e., each electrode 108, 110 is active), for a given acceleration input, each give rise to equal in magnitude, but opposite in sign frequency shifts.

Referring back to FIG. 1, the single body multi-mode mechanical resonator 100 further includes a plurality of interdigitated shaped combs 112. The plurality of interdigitated shaped combs 112 is attached to each lumped mass as shown in FIG. 1 and FIG. 2. The plurality of interdigitated shaped combs 112 compensates for a frequency drift of the drive mode and cancels first-order displacement effects of the plurality of interdigitated shaped combs. In an example, frequency drift refers to undesirable effects, such as a change in frequency due to temperature variations. The profile of the plurality of interdigitated shaped combs 112 is designed such that the force produced is linearly related to the displacement. The plurality of interdigitated shaped combs 112 have a stationary finger and a moving finger that produce the force. The force between the stationary finger and the moving finger can be represented by the following equation (III):

$$F(x) = \epsilon_0 t V^2 / h(x) \quad (III)$$

where $F(x)$ the amount of force generated between a pair of a stationary finger and a moving finger, $\epsilon_0$ is the permittivity of free space, t is the thickness of the stationary finger and a moving finger, V is the voltage difference between the stationary finger and moving finger, and $h(x)$ is size of the gap between a stationary finger and a moving finger.

To generate a specific force ($F(x)$) between a pair of stationary and moving fingers, a gap between the stationary finger and the moving finger needs to be a specific shape or profile. In an example, one of the fingers is selected to have rectangular geometry and the other has a curved profile to generate the gap. Thus, to produce a force that is linear with respect to x, the size of the gap between the stationary finger and moving finger is represented by the following equation (IV):

$$h(x) = g_0 / (1 + x / x_{CL}) \quad (IV)$$

where $g_0$ is the gap between a straight comb and the maximum distance between the straight comb and a curved comb and $x_{CL}$ is a dimensional constant. In the equation (IV), the straight comb is the stationary finger or moving finger and the curved comb is different from the straight comb and either the stationary finger or the moving finger. In an example, the movement distance of the moving fingers can be equal to or less than 10 microns. In another example, the movement distance can be adjusted based on the needs to reach a specific displacement for low noise operating and accuracy of the fabrication methods to match the gap profile described in equation (IV). In an example, the plurality of interdigitated shaped combs 112 may be present in any amount that compensates for slow frequency drifts. In some examples, the plurality of interdigitated shaped combs 112 is present in an amount of equal to or greater than 500 sets of the stationary finger and the moving finger.

Referring back to FIG. 1, the single body multi-mode mechanical resonator 100 also includes a plurality of interdigitated drive combs 114. The plurality of interdigitated drive combs 114 are attached to each lumped mass as shown in FIG. 1 and FIG. 2. The plurality of interdigitated drive combs 114 are aligned to the anti-phase mode that, with a frequency selective excitation, can excite the anti-phase mode with a low voltage when the single body multi-mode mechanical resonator 100 is operated within a low-pressure environment, which minimizes the effect of viscous damping. Frequency selective excitation refers to when the anti-phase mode exhibits resonance phenomena. The resonance phenomena has the largest displacement at specific resonant frequencies. Moreover, there are specific phase relationships between the input and output at these resonant frequencies such that a feedback system that compensates for the phase delay and damping can amplify oscillations at these frequencies subject to nonlinear effects. In an example, the low-pressure environment is equal to or less than 10 mTorr. In the example shown in FIG. 1, there is one set of a plurality of interdigitated drive combs 114 for each spring-mass device 102. In other examples, there are one or more sets of interdigitated drive combs 114 for each spring-mass device 102 where each set of interdigitated drive combs 114 includes a plurality of interdigitated drive combs.

Referring now to FIG. 1, the single body multi-mode mechanical resonator 100 includes a plurality of interdigitated sense combs 116 that are attached to each lumped mass as shown in FIG. 1 and FIG. 2. The plurality of interdigitated sense combs 116 are aligned to the anti-phase mode, are grounded when the single body multi-mode mechanical resonator 100 is polarized, and are capable of cancelling common-mode noise effects. The motion of the anti-phase mode induces a charge in one half of the plurality of interdigitated sense combs 116 that is equal in magnitude, but opposite in sign to the charge in the other one half of plurality of interdigitated sense combs 116 such that a differential measurement can cancel common-mode noise effects. Common-mode noise effects are noise effects shared between various nodes that are independent of the orientation or relative position of these nodes. An example of a common-mode noise effect is the noise that arises due to the bias voltage applied to the single body multi-mode mechanical resonator 100. In the example of the single body multi-mode mechanical resonator 100 in FIG. 1, each spring-mass device 102 has four sets of interdigitated sense combs 116 where each set of interdigitated sense combs 116 includes a plurality of interdigitated sense combs 116. In another example, each spring-mass device 102 has one or more sets of interdigitated sense combs 116 where each set of interdigitated sense combs 116 includes a plurality of interdigitated sense combs 116.

Overall, the single body multi-mode mechanical resonator 100 may be composed of a variety of materials. For example, the single body multi-mode mechanical resonator 100 herein may be composed of silicon, quartz, n or p-type doped silicon, lead zirconate titanate, or a combination thereof. The selective deposition of metallic layers may be used for electrically connecting components to the single body multi-mode mechanical resonator 100 to an accelerometer or enhancing the operation of the single body multi-mode mechanical resonator 100. For example, a 20 nm layer of Chromium can be evaporated as a first layer to enhance the adhesion of a thicker 500 nm layer of gold for electrical contacts. The location of these contact are based on the need to electrically connect the device to other systems and placed with rigid connections to a lower fixed substrate. This layer can be placed over a larger area, but placement of the electrical layer over areas designed to move can result in a bending or curling of the device. Chrome is used as an adhesion layer to make sure the gold sticks. In some examples, titanium may be used instead of chrome as an adhesion layer. In an example, the single body multi-mode mechanical resonator 100 may have a device layer thickness ranging from about 2 μm to about 500 μm.

The single body multi-mode mechanical resonator 100 is also capable of being integrated with electronic subsystems to create the single body multi-mode mechanical resonator accelerometer. In an example, only one single body multi-mode mechanical resonator 100 is needed in the single body multi-mode mechanical resonator accelerometer. In an example, the electronic subsystems include a substrate, a chip carrier, an interface electronics circuit board or a combination thereof. In an example, the single body multi-mode mechanical resonator 100 is mounted to a fixed substrate (e.g., a silicon substrate). The fixed substrate is mounted to a chip carrier and the chip carrier is mounted to an interface electronics circuit board. In some examples, a leveling mount may also be used where the interface electronics circuit board, chip carrier, and fixed substrate are mounted on the leveling mount. In addition, the interface electronics circuit board, chip carrier, and fixed substrate, and, in some examples, the leveling mount are in a vacuum enclosure to vacuum seal the components.

Other known components required for the use of an accelerometer are also used to form a functional accelerometer, such as a positive feedback system, an automatic gain control circuit, a bias reference or voltage source, a modulation reference, and an accelerometer controller. The accelerometer controller is able to measure or demodulate the frequency of the single body multi-mode accelerometer 100, further process the demodulated frequency to extract information at harmonics of the modulation reference, use this data to estimate acceleration, and provide an input to a control system that adjust the voltage applied to the plurality of interdigitated shaped combs 112 such that the mean, average, or 0-th harmonic of the modulation reference is maintained at a constant value. The accelerometer controller also has the ability to store or transmit data to allow for further processing, and implement algorithms to compensate for short or long-term drift.

Figure 3:
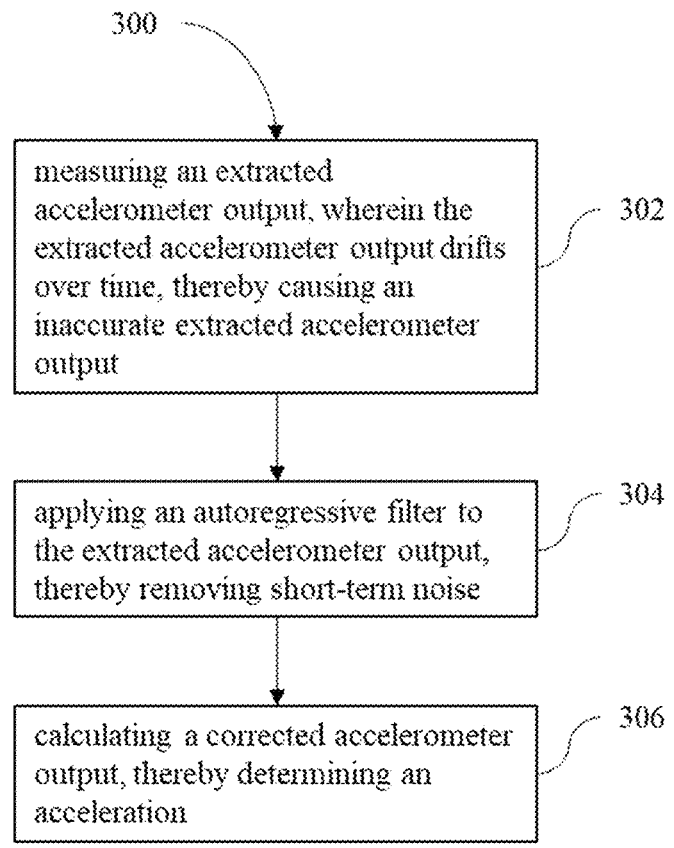
FIG. 3 is an example of a method for real-time frequency modulated bias calibration of short-term drift in an accelerometer.

Referring now to FIG. 3, an example of a method 300 for real-time frequency modulated bias calibration of short-term drift in the single-body multi-mode mechanical resonator accelerometer is shown. In the method 300, an extracted accelerometer output is measured 302 where the extracted accelerometer output drifts over time, thereby causing an inaccurate extracted accelerometer output. The drift occurs because effects that cause the frequency of the anti-phase mode to drift, for example temperature variations, cannot be separated from acceleration from linear motion that also causes the frequency of the anti-phase mode to shift. In an example, the extracted output of the accelerometer is obtained by measuring the output of an interface electronic circuit that corresponds to a displacement of two or more spring-mass devices 102 in an anti-phase mode, a differential charge produced by motion of two or more spring-mass devices 102 in the anti-phase mode, or a combination thereof. In some examples, the measurement may be further processed to obtain the final extracted output of the accelerometer prior to using the autoregressive filter.

Referring back to FIG. 3, the method 300 further includes applying an autoregressive filter to the extracted accelerometer output 304, thereby removing short-term noise. The autoregressive filter removes or filters stationary noise processes from the extracted accelerometer output. The autoregressive filter is applied using the following equation (V):

$$y_t = \delta_0 + \delta_1 t + \Sigma_{k=0}^{p} \phi_k y_{t-s} + \epsilon_t \quad \text{(V)}$$

where t is time, $\delta_0$ is linear offset, $\delta_1$ is linear trend with time, p is an autoregressive model order, $\phi_k$ is an autoregressive model parameter, $y_{t-k}$ is a model value at discrete time (t-k), k is a k-th term of the summation, and $\epsilon_t$ is uncorrelated noise process at discrete time t. In some examples, the autoregressive filter is fit to an autoregressive model that automatically selects the model order based on an Akaike information criterion. In another example, the autoregressive filter is fit to an autoregressive model that automatically selects the model order based on an Akaike information criterion, another metric that penalizes high model orders to minimize the potential of overfitting, or a combination thereof.

Referring back to FIG. 3, the method 300 includes calculating a corrected accelerometer output 306, thereby determining an acceleration. The method 300 may be performed by a computer processor, an application-specific integrated circuit, a field programmable gate array, or a microcontroller. Specifically, a computer processor, an application-specific integrated circuit, a field programmable gate array, or a microcontroller is used to record a measurement of the extracted output of the accelerometer, apply the autoregressive filter, and calculate the corrected accelerometer output.

Figure 4:
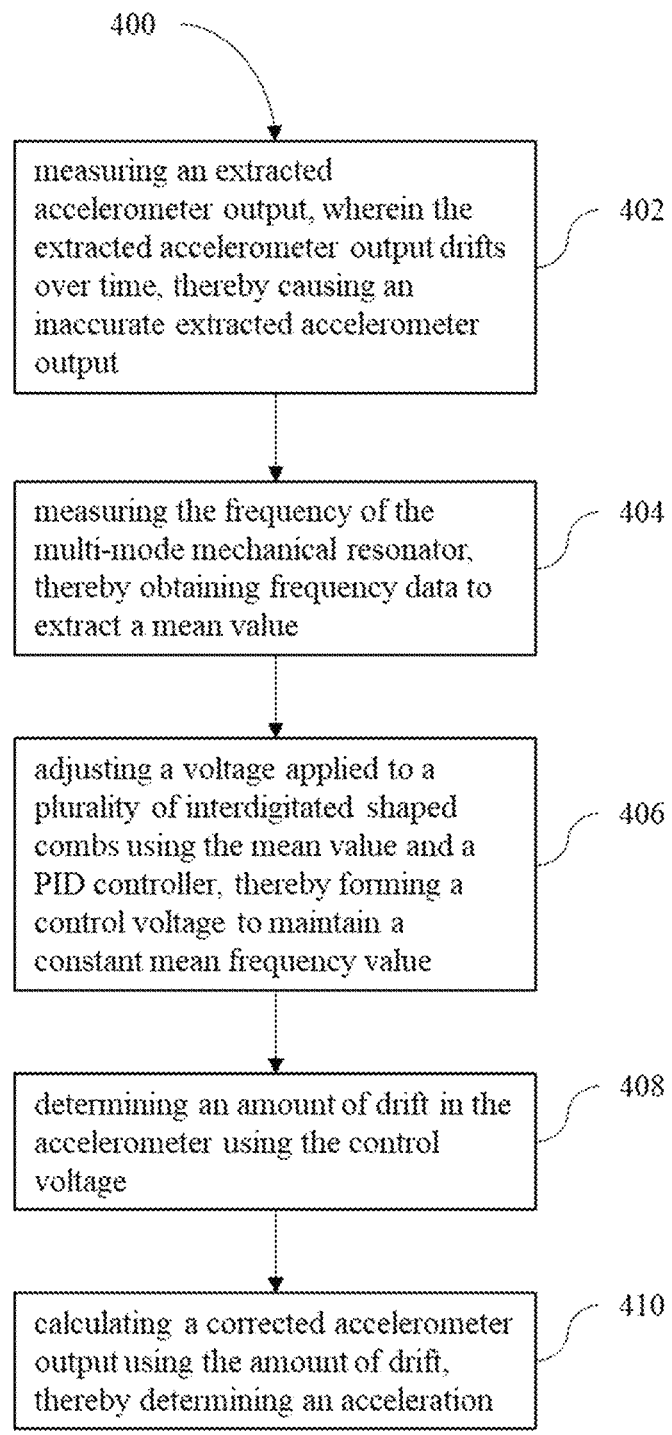
FIG. 4 is another example of a method for real-time frequency modulated bias calibration of long-term drift in an accelerometer.

Referring now to FIG. 4, an example of a method 400 for real-time frequency modulated bias calibration of long-term drift in a single-body multi-mode mechanical resonator accelerometer is shown. The method 400 includes measuring an extracted accelerometer output 402, wherein the extracted accelerometer output drifts over time, thereby causing an inaccurate extracted accelerometer output. The method of extracting accelerometer output 402 is the same as previously described herein in method 300 for measuring an extracted accelerometer output 302.

Referring back to FIG. 4, the method 400 includes measuring the frequency of a single-body multi-mode mechanical resonator accelerometer 404, thereby obtaining frequency data to extract a mean value. In an example, the mean value of the frequency is exacted with a digital low-pass filter. In an example, a digital low-pass filter can be implemented with either digital electronic circuits or a software algorithm provided that when the input signal to the filter is considered a composition of many signals at various frequencies, frequencies above a specified cutoff frequency are attenuated. For the low-pass filter to extract the mean value, this cut-off frequency must below the frequency of a modulation reference frequency. The cut-off frequency may vary depending on the application of the single body multi-mode mechanical resonator accelerometer.

Referring back to FIG. 4, the method 400 includes adjusting a voltage applied to a plurality of interdigitated shaped combs 112 using the mean value and a proportional-integral-derivative controller or a proportional-integral controller (PID or PI controller) 406, thereby forming a control voltage to maintain a constant mean frequency value. The plurality of interdigitated shaped combs 112 are the same plurality of interdigitated shaped combs 112 as previously described herein. In an example, the applied voltage is enough to change the stiffness of the single body multi-mode resonator 100 to overcome changes due to effects, such as changing temperature. For example, a range of about 1% to about 5% change in stiffness of the single body multi-mode mechanical resonator 100 to overcome changes due to the temperature associated with the choice of material (e.g. silicon) and the anticipated fluctuations in ambient temperature. In another example, the amount of voltage applied is based on the stiffness of the anti-phase mode, the number of the plurality of interdigitated shaped combs 112, and the geometry of the plurality of interdigitated shaped combs 112, in particular, the dimensional constant of the plurality of interdigitated shaped combs 112. In an example, the PID controller may be any controller capable of adjusting the voltage such that the error is zero.

Referring back to FIG. 4, the method 400 includes determining an amount of drift in the accelerometer using the control voltage 408. In an example, to determine the amount of drift in the accelerometer, an assumption is made that there is a linear relationship between the drift and the control voltage. The correlation coefficient R quantifies the strength of the linear relationship (shown in FIG. 8A). An R of either 1 or −1 is a perfect linear relationship. Equation (VI) shows how the corrected accelerometer output (A1S_corrected) is determined:

$$A1S\_corrected = A1S + m*y\_A\_LP + b$$

Where y_A_LP is the low pass filtered version of the control voltage, A1S is the output of the accelerometer, m is the slope from the linear fit, and b is the intercept of the linear fit. These values are estimated using linear regression. Once this relationship is learned, future drifted of the accelerometer can be corrected by using the fitted relationship and the current value for the control voltage. In an example, 408 can be performed by a computer processor to determine the amount of drift for the subsequent calculation below in 410.

Referring back to FIG. 4, the method 400 includes calculating a corrected accelerometer output using the amount of drift 410, thereby determining an acceleration. Based on the fitted linear relationship discussed above in 408, any changes in control voltage can be assumed to produce a linear change in the output of the accelerometer. Therefore, as stated above, future drift of the accelerometer can be corrected by using the fitted relationship and the current value for the control voltage. In an example, 410 can be performed by a computer processor to determine the acceleration.

In a specific example of method 400, the plurality of interdigitated shaped combs 112 have one end attached to the body of the single body multi-mode mechanical resonator 100 and the other end is fixed in space. A bias voltage is applied to the lumped masses of the single body multi-mode mechanical resonator 100 causing movement and producing a charge. This charge is then converted to a voltage with circuits on the interface electronics board. The voltage is then connected to an analog to digital converter (ADC) on a single board computer. The single board computer runs a program to control the accelerometer. Part of this program is a software phase locked loop (PLL) that extracts the frequency of the single body multi-mode resonator 100. A PLL can be either an analog circuit, digital circuit or software algorithm. The key characteristic of a PLL is this control system is the adjustment of the frequency of the single body multi-mode resonator 100 internal to this device to maintain a constant phase relationship between this single body multi-mode resonator 100 and the input. When the phase between two signals is constant, both signals have the same frequency, so the frequency of the internal single body multi-mode resonator 100 can be used to track the frequency of the input signal. A second PLL is used to track the frequency and phase of the signal applied to the phase 1 parallel plate electrode 108. Following compensation of the extracted phase, this can be used to demodulate a given harmonic. This is done by multiplying the extracted reference by frequency, and then low-pass filtering to remove higher-order harmonics.

As stated in the example, the method 400 is performed by a computer processor (i.e., a single board computer). The method 400 can also be performed by an application-specific integrated circuit, a field programmable gate array, or a microcontroller. The computer processor, application-specific integrated circuit, field programmable gate array, or microcontroller is used to record a measurement output of the extracted accelerometer output, record a frequency measurement of the single body multi-mode resonator 100, adjust the voltage applied to the plurality of interdigitated shaped combs 112, determine the amount of drift in the accelerometer, and calculate the corrected accelerometer output.

Figure 5:
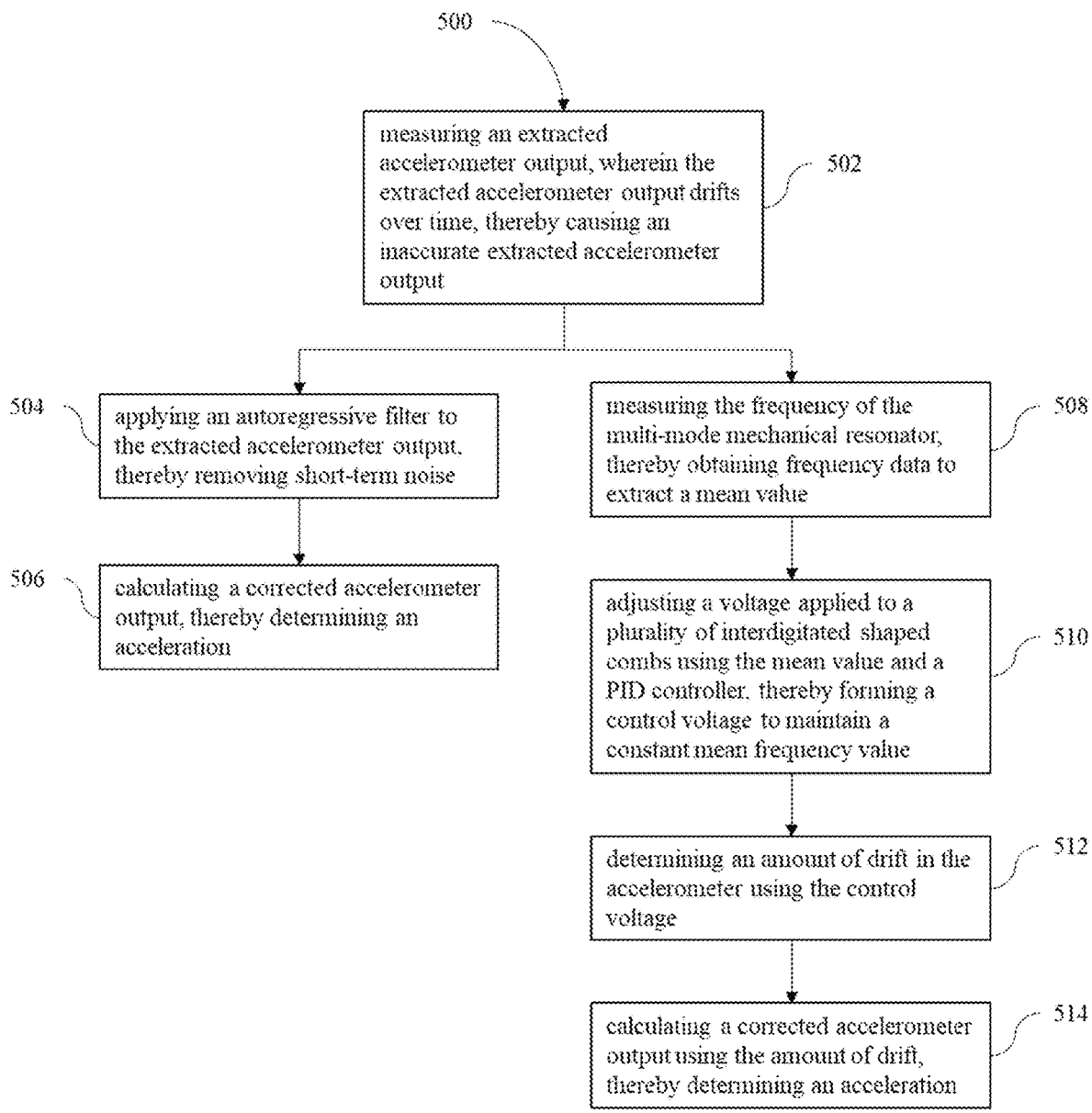
FIG. 5 is another example of a method for real-time frequency modulated bias calibration of short-term drift and long-term drift in an accelerometer.

Referring now to FIG. 5, an example of method 500 for real-time frequency modulated bias calibration of short-term drift and long-term drift in an accelerometer is shown. The method 500 includes measuring an extracted accelerometer output 502, wherein the extracted accelerometer output drifts over time, thereby causing an inaccurate extracted accelerometer output. The measured extracted accelerometer output 502 is the same as previously described herein in methods 300, 400 for measuring an extracted accelerometer output 302, 402.

Referring back to FIG. 5, the method 500 includes performing determining a corrected short-term accelerometer output, determining a corrected long-term accelerometer output, or a combination thereof. In an example, if determining a corrected short-term accelerometer output and determining a corrected long-term accelerometer output are both performed, the determinations may be performed sequentially or simultaneously. In another example, if determining a corrected short-term accelerometer output and determining a corrected long-term accelerometer output are both performed, determining the long-term accelerometer output occurs before determining the corrected short-term accelerometer output.

When determining a corrected short-term accelerometer output is performed in method 500, the short-term accelerometer output is determined by applying an autoregressive filter to the extracted accelerometer output 504, thereby removing short-term noise and calculating the corrected short-term accelerometer output 506, thereby determining a short-term acceleration. The applying an autoregressive filter to the extracted accelerometer output 504 and calculating the corrected short-term accelerometer output 506 are the same applying an autoregressive filter to the extracted accelerometer output 304 and calculating the corrected short-term accelerometer output 306 as previously described herein for the method 300.

When determining a corrected long-term accelerometer output is performed in method 500, the long-term accelerometer output is determined by measuring the frequency of the single body multi-mode resonator 100508, thereby obtaining frequency data to extract a mean value, adjusting a voltage applied to a plurality of interdigitated shaped combs 112 using the mean value and a control algorithm 510, thereby forming a control voltage to maintain a constant mean frequency value, determining an amount of drift in the accelerometer using the control voltage 512, and calculating the corrected long-term accelerometer output 514, thereby determining a long-term acceleration. The measuring the frequency of the single body multi-mode resonator 100508, adjusting a voltage applied to a plurality of interdigitated shaped combs 112 using the mean value and a control algorithm 510, determining an amount of drift in the accelerometer using the control voltage 512, and calculating the corrected long-term accelerometer output 514 is the same measuring the frequency of the single body multi-mode resonator 100 404, adjusting a voltage applied to a plurality of interdigitated shaped combs 112 using the mean value and a control algorithm 406, determining an amount of drift in the accelerometer using the control voltage 408, and calculating the corrected long-term accelerometer output 410 as previously described herein for method 400.

To further illustrate the present disclosure, examples are given herein. These examples are provided for illustrative purposes and are not to be construed as limiting the scope of the present disclosure.

Example

For the fabrication of the single body multi-mode mechanical resonator, the SOIMUMPS process by MEMSCAP was selected. The process uses four masks to define regions to be etched and the deposition of metals. A device layer thickness of 25 μm was selected. The design area was 9 mm by 9 mm, but laser subdicing was used to provide for smaller sections. The laser subdicing was used to help to mitigate potential issues of dies being damaged during other dicing methods such as with a dicing saw.

The location of mechanical anchors were moved to the edge of the design. The SOIMUMPS process uses a backside etch release process, so this modification was needed to be compatible. Active frequency control was implemented by adjusting the bias voltage applied for the tuning electrodes. To allow for active frequency compensation that does not degrade phase noise, shaped combs were introduced to the device layout. Softening shaped combs were selected with a modest value for dimensional constant.

Experimental Setup

Figure 6:
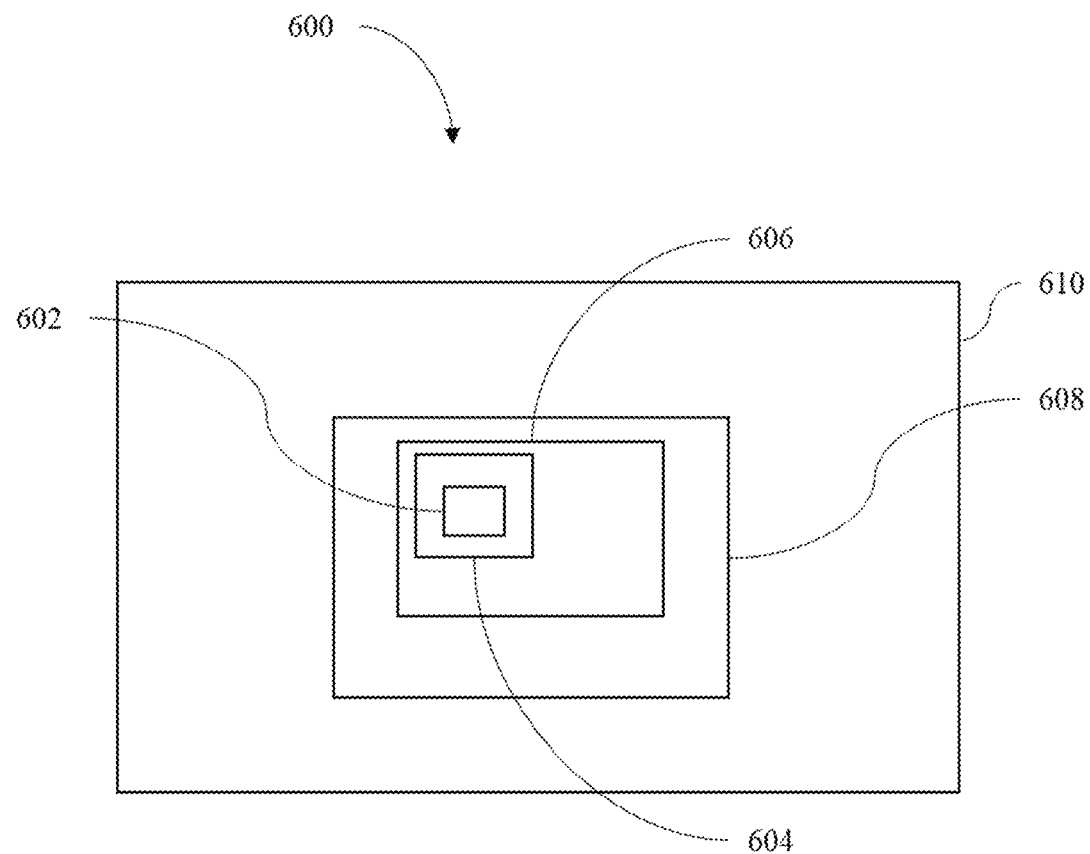
FIG. 6 is a diagram of an example of a design of an experimental multi-mode mechanical resonator.

FIG. 6 shows an example of the experimental setup 600. The parts were sent out for wire bonding with a local vendor. The selected packages 604 are custom 32-pin ceramic chip carriers 606. To adhere the die 602 to the chip carrier 604, the non-conductive epoxy Loctite Ablestik 789-3 was. In the past, a cyanoacrylate-based epoxy was used. Due to challenges with carefully placing the cyanoacrylate-based epoxy, the Loctite epoxy was used. To cure the epoxy, the dies 602 were heated to 150° C. for 30 minutes. After this, the dies 602 were wire bonded using standard 1 mil Au wire. To enable direct measurements of gravity, a 3D printed leveling mount 608 was created to hold the interface electronics board. The interface electronics board held the chip carrier that the die was bonded to. Using a simple bubble level as a reference, three screws equally spaced around the edge of the base can be adjusted to provide a consist means to directly measure local gravity.

The device discussed in this work requires a vacuum to function properly. A custom acrylic vacuum chamber 610 with a high number feedthroughs and a movable base was made by Sanatron. While the system was designed to reach a minimum pressure of 10 mTorr, it typically reaches above that value after an hour of pumping (about 15 mTorr).

An electronic subsystem was used to implement the accelerometer. The interface electronics board contained a socket to hold the packaged resonator for the accelerometer, active electronics to convert the charge output of the device to a voltage, and wiring to connect the resonator to other subsystems. To implement the needed single body multi-mode resonator 100, a closed-loop system using the phase shifter and inverter/buffer were implemented. The phase shifter contained a digital potentiometer to enable automated adjustment of the phase shift. To control the amplitude of the single body multi-mode resonator 100, an amplitude control circuit (AGC) was added. This circuit adjusts the supply limits of the inverter/buffer to control the amplitude of the single body multi-mode resonator 100 to a constant value. To address state-state error, a proportional-integral (PI) controller scheme was selected. The displacement of the single body multi-mode resonator 100 is digitized using a STEMlab 125-14 from Red Pitaya. Frequency detection, signal demodulation, and digital control loops were implemented with this device. For active frequency control, one of the digital to analog converters (DACs) on the STEMlab 125-14 was connected to an offset amplifier to level shift the output of the DAC to the one needed. A digital PI control loop was implemented to maintain the single body multi-mode resonator 100 at a constant frequency. To provide the voltages needed during the two different tuning phases, a function generator with a differential output was selected. To provide the needed reference for demodulation, the function generator was connected to the second input on the Red Pitaya.

Experimental Testing and Results

Figure 7A:
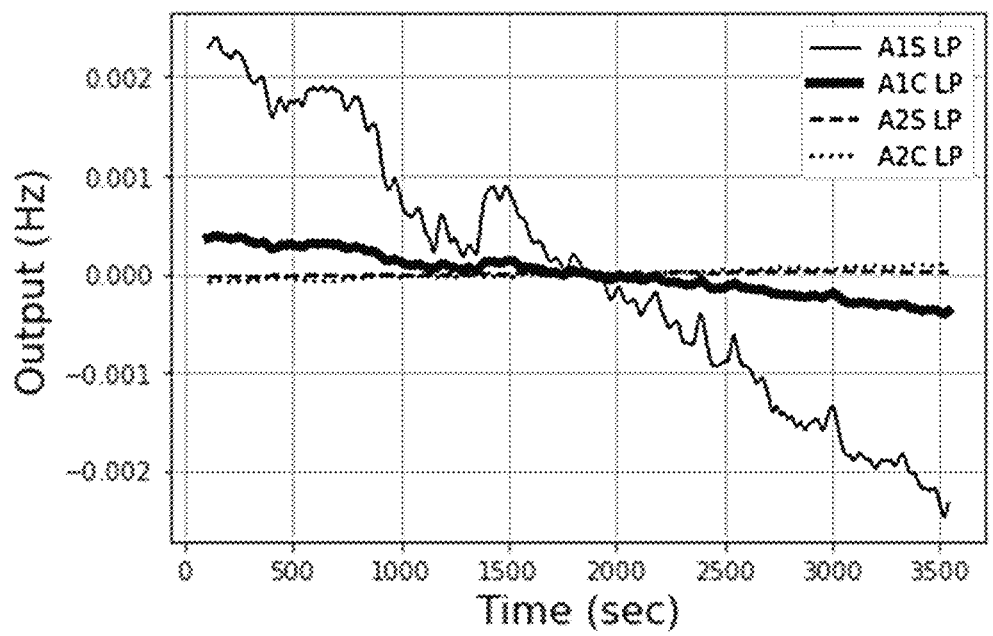
FIG. 7A-7B are graphs of accelerometer measurement data and Allen deviation data of the accelerometer data, respectively.
Figure 7B:
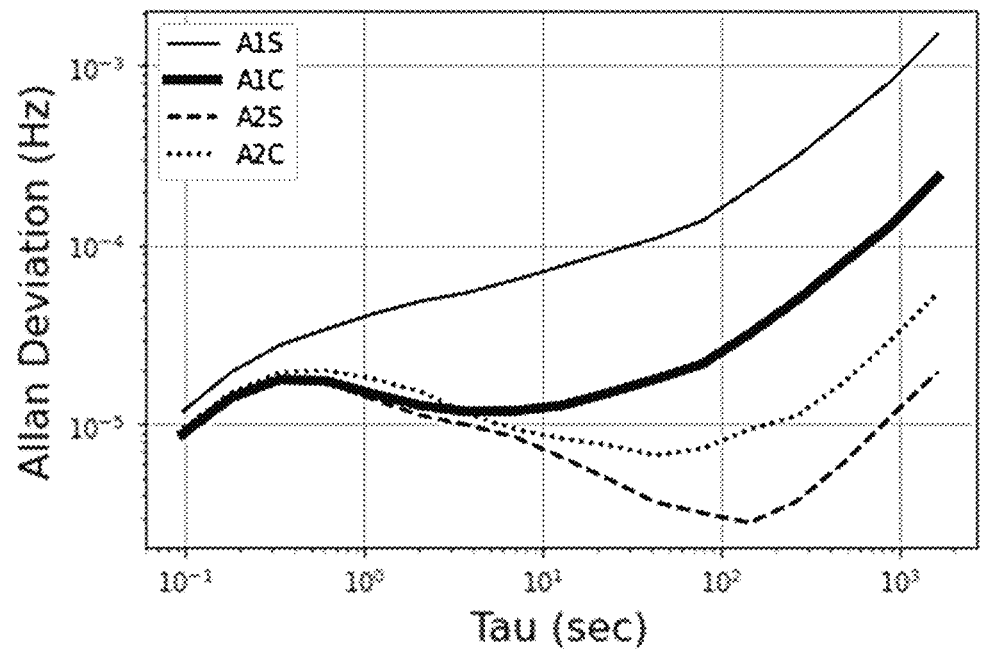

Using the experimental setup described herein, measurements from the accelerometer were taken. Results are shown in FIG. 7A. As the device was tested using the leveling mount, the input acceleration is assumed to be −1 g. To show the response of the different harmonics in the same figure, the signals were low-pass filtered and then the mean values were removed. All of the signals exhibit drift, however the drift rate of acceleration output, s1, is the greatest. This is clearer when the Allen deviation of these signals, shown in FIG. 7B, are calculated.

Figure 8A:
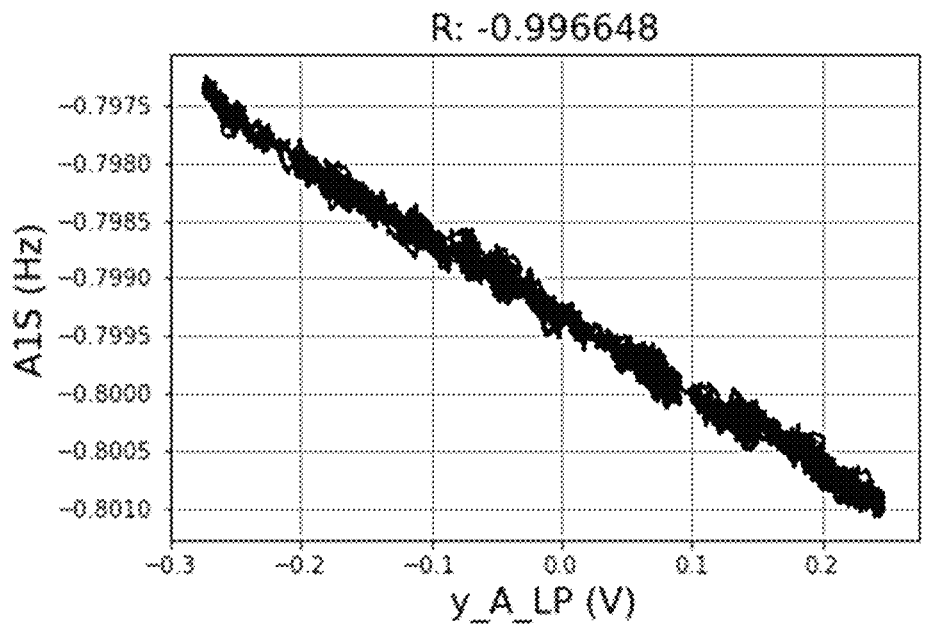
FIG. 8A-8B are a scatter plot of the acceleration output and the control voltage used to maintain a constant frequency and a graph of an Allen deviation of the accelerometer output corrected using the frequency control voltage as a reference, respectively.
Figure 8B:
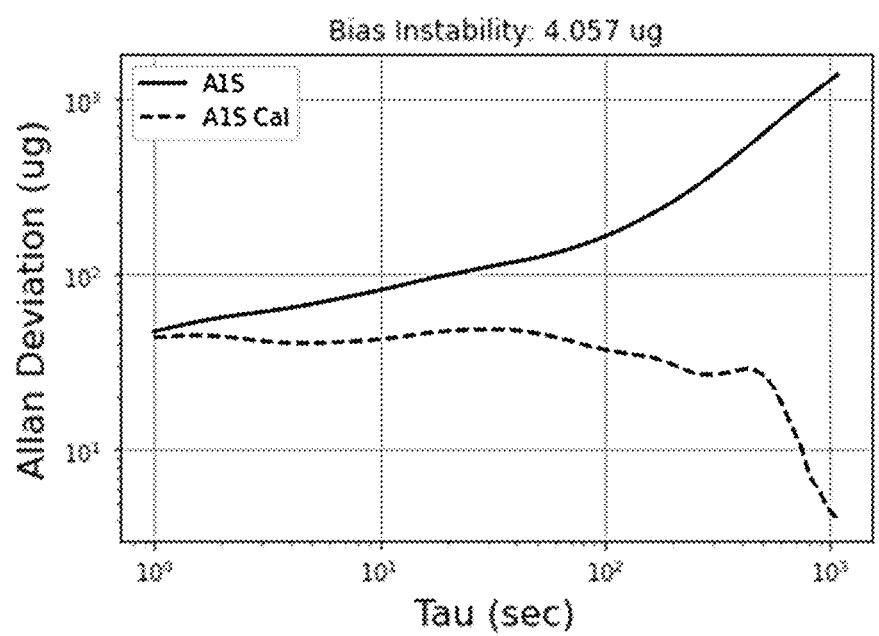

This device was tested while under active frequency control, so the frequency of the single body multi-mode resonator 100 does not drift, but the control voltage used to maintain a constant frequency provides an indirect means to measure this drift if the controller was disabled. Shown in FIG. 8A is a scatter plot of s1 and the control voltage. Using this signal to correct for drift, the Allen deviation is shown in FIG. 8B. Assuming that the output of s1 is 1 g, the results have been scaled. The advantage of this method is that the control voltage is less noisy, so the short-term stability is not compromised. The other is that the Allen deviation tends to decrease as the integration time is further increased.

As correlated noise processes are dependent on their prior state, the correlated noise was removed using an autoregressive filter of the form:

$$y_t = \delta_0 + \delta_1 t + \Sigma_{k=0}^p \phi_k y_{t-k} + \epsilon_t$$

where the current state is modeled as a linear combination of prior values and an uncorrelated noise process. To mitigate the need to estimate a very high number of parameters for an autoregressive model, the signal calibrated using the control voltage was decimated to a slower sampling frequency. This decimated signal was then fit to an autoregressive model that automatically selects the model order based on optimizing the Akaike information criterion (AIC). The AIC of a given model is related to the log-likelihood of the model with a penalty for the number of parameters to balance issues related to over-fitting.

Figure 9A:
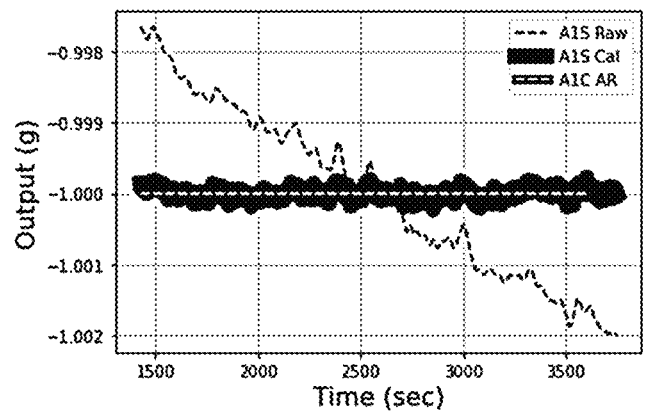
FIG. 9A-9C are graphs of the raw accelerometer output vs. time, the power spectral density of the accelerometer output vs. the frequency, and Allen deviation of the accelerometer output vs. Tau (sec), respectively.
Figure 9B:
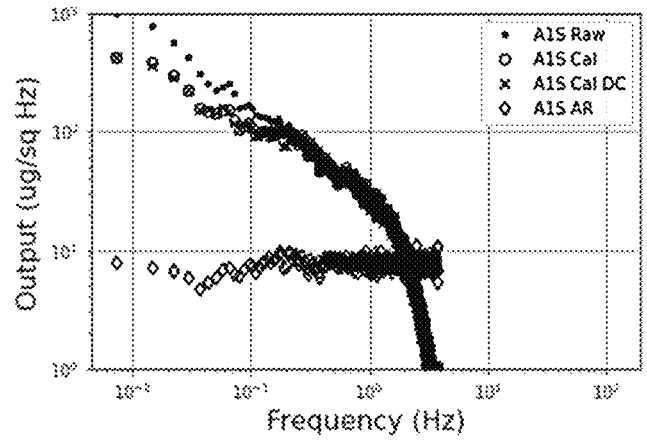
Figure 9C:
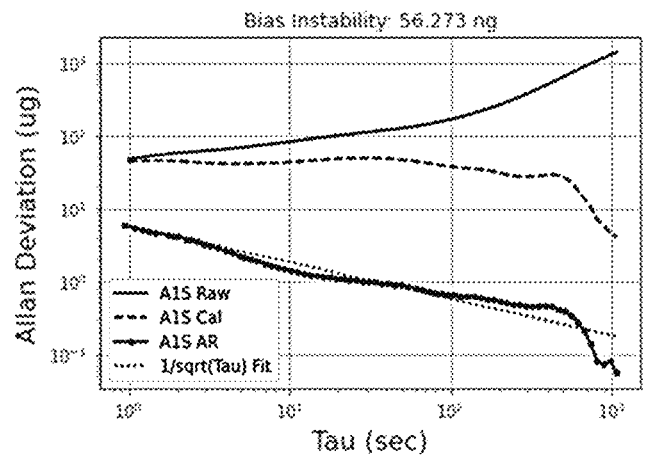

To demonstrate how well this method of using the control voltage to limit long-term drift and using an autoregressive model to limit short-term drift, the time series of the accelerometer output and the corrected versions are shown in FIG. 9A. The PSD of these signals are shown in FIG. 9B. With the signal filtered using the autoregressive model, the output of the sensor is dominated by uncorrelated noise. The Allen deviation of these signals are shown in FIG. 9C. On long time scale, the filtered accelerometer output does not exhibit drift. The bias instability, or the lowest point of the Allen deviation, is estimated to be about 55 ng.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 2 μm to about 500 μm should be interpreted to include not only the explicitly recited limits of from about 2 μm to about 500 μm, but also to include individual values, such as 100 μm, 200 μm, 350 μm, etc., and sub-ranges, such as from about 50 μm to about 150 μm, etc.

In describing and claiming the examples disclosed herein, the singular forms "a", "an", and "the" include plural referents unless the context clearly dictates otherwise.

What is claimed is:

1. A single-body multi-mode mechanical resonator, comprising:
two or more spring mass devices, wherein the two or more spring mass devices include two or more lumped masses and one or more anchor springs where the one or more anchor springs attach the two or more lumped masses to a fixed substrate and the two or more spring mass devices have an anti-phase mode and an in-phase mode;
one or more coupling springs, wherein the one or more coupling springs are attached to each lumped mass and couple a motion of the two or more lumped masses;
two or more parallel plate electrodes, wherein each lumped mass has at least two of the two or more parallel plate electrodes attached thereto and the two or more parallel plate electrodes apply forces to the in-phase mode that yield equal in magnitude, but opposite in sign frequency shifts of the anti-phase mode;
a plurality of interdigitated shaped combs, wherein the plurality of interdigitated shaped combs is attached to each lumped mass and compensates for a frequency drift of the anti-phase mode and cancels first-order displacement effects of the plurality of interdigitated shaped combs;
a plurality of interdigitated drive combs, wherein the plurality of interdigitated drive combs are attached to each lumped mass and are aligned to the anti-phase mode, with a frequency selective excitation, can excite the anti-phase mode with a low voltage when the multi-mode mechanical resonator is operated within a low-pressure environment;
a plurality of interdigitated sense combs, wherein the plurality of interdigitated sense combs are attached to each lumped mass and are aligned to the anti-phase mode, are grounded when the multi-mode mechanical resonator is polarized, and cancel common-mode noise effects.

2. The multi-mode mechanical resonator of claim 1, wherein the multi-mode mechanical resonator has a device layer thickness ranging from about 2 um to about 500 μm.

3. The multi-mode mechanical resonator of claim 1, wherein the two or more spring-mass devices have the motion described with equations (I) and (II):

$$M_1(x''_1 - x''_{1Accel}) = -K_1(x_1-0) - K_c(x_1-x_2) - F_{1A} + F_{1B} \quad (I)$$

$$M_2(x''_2 - x''_{2Accel}) = -K_2(x_2-0) - K_c(x_2-x_1) - F_{2A} + F_{2B} \quad (II)$$

where $M_1$ is a lumped mass of a first mass, $M_2$ is a lumped mass of a second mass, $K_1$ is a first anchor spring stiffness, $K_2$ is a second anchor spring stiffness, $K_c$ is a coupling spring stiffness, $x_1$ is a displacement of the first mass, $x_2$ is a displacement of the second mass, $x''_1$ is an acceleration of the first mass, $x''_2$ is an acceleration of the second mass, $x''_{1Accel}$ is a proper acceleration of the first mass, $x''_{2Accel}$ is a proper acceleration of the second mass, $F_{1A}$ is a phase 1 electrostatic force applied to the first mass, $F_{1B}$ a phase 2 electrostatic force applied to the second mass, $F_{2A}$ is a phase 1 electrostatic force applied to the second mass, and $F_{2B}$ is a phase 2 electrostatic force applied to the first mass.

4. The multi-mode mechanical resonator of claim 1, wherein the multi-mode mechanical resonator is composed of silicon, quartz, n or p type doped silicon, lead zirconate titanate, or a combination thereof.

5. The multi-mode mechanical resonator of claim 4, wherein a metallic layer is applied to the multi-mode mechanical resonator to electrically connect the multi-mode mechanical resonator to an accelerometer.

6. The multi-mode mechanical resonator of claim 1, wherein the plurality of interdigitated shaped combs have a stationary finger and a moving finger.

7. The resonator of claim 6, wherein the moving finger and the stationary finger have a gap between the stationary finger and the moving finger represented by an equation (III):

$$h(x) = g_0/(1 + x/x_{CL}) \quad (III)$$

where $g_0$ is the gap between a straight comb and a maximum distance between the straight comb and a curved comb and $x_{CL}$ is a dimensional constant wherein the straight comb is the stationary finger or the moving finger and the curved comb is different than the straight comb and either the stationary finger or the moving finger.

8. The multi-mode mechanical resonator of claim 1, wherein the multi-mode mechanical resonator is integrated with electronic subsystems to create a single body multi-mode mechanical resonator accelerometer with one single body multi-mode mechanical resonator.

9. The multi-mode mechanical resonator of claim 1, wherein the anti-phase mode is insensitive to external acceleration and the in-phase mode is sensitive to acceleration.

10. The multi-mode mechanical resonator of claim 6, wherein the plurality of interdigitated shaped combs is present in an amount of equal to or greater than 500 sets of the stationary finger and the moving finger.

* * * * *